P. J. WINN.

GATE LATCH.

No. 10,128. Reissued May 30, 1882.

Attest
A. M. Tanner
E. D. Lancaster

Inventor,
Philip J. Winn,
by Paine & Ladd,
Attorneys.

N. PETERS. Photo-Lithographer, Washington, D. C.

UNITED STATES PATENT OFFICE.

PHILIP J. WINN, OF FORK UNION, VIRGINIA.

GATE-LATCH.

SPECIFICATION forming part of Reissued Letters Patent No. 10,128, dated May 30, 1882.

Original No. 245,253, dated August 2, 1881. Application for reissue filed December 12, 1881.

*To all whom it may concern:*

Be it known that I, PHILIP JAMES WINN, of Fork Union, in the county of Fluvanna and State of Virginia, have invented certain new and useful Improvements in Gate-Latches; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

The present invention relates to that class of gate-latches in which a pivoted catch-plate on the gate-post operates in connection with a rod or bar carried by the gate, so that when the latter is closed said rod or bar will automatically engage with an inclined or wedge-shaped portion of the pivoted catch-plate, and, after raising the latter, pass behind the same for locking the gate.

The invention consists in a simplified construction and arrangement of parts, which will hereinafter be more fully described, and then set forth in the claim.

Figure 1:
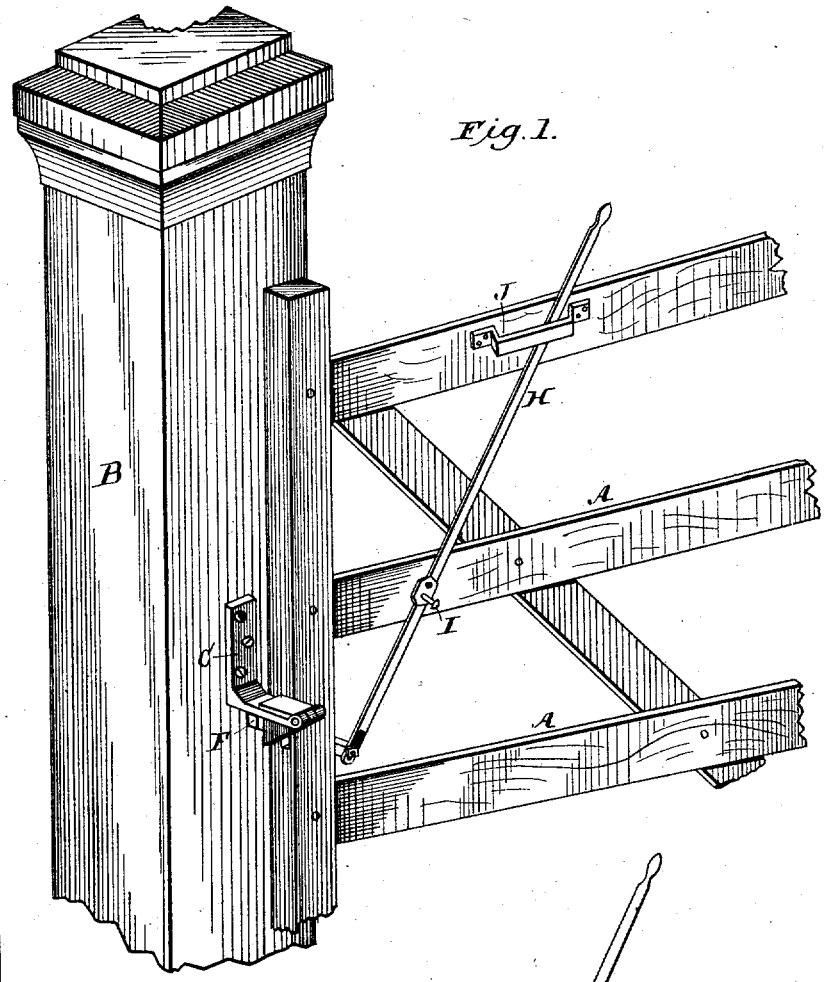
Figure 2:
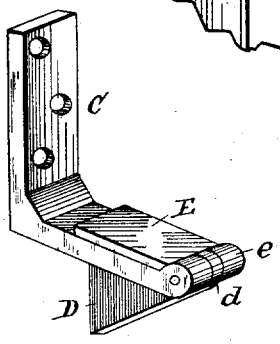
Figure 3:
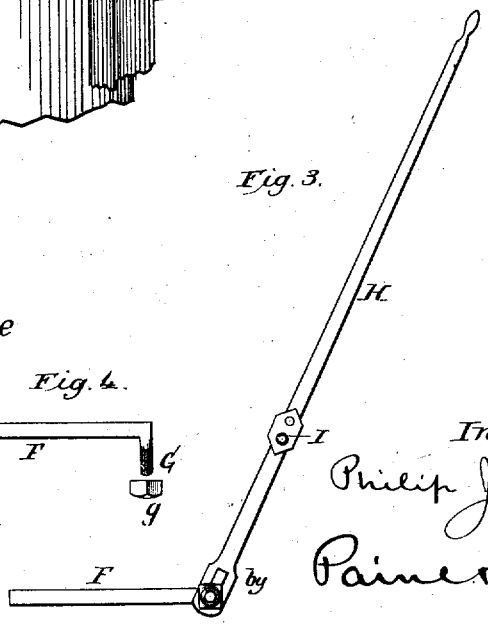
Figure 4:
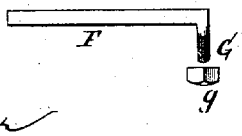

In the drawings, Figure 1 is a front elevation of a post and gate, showing the latter in a closed position. Fig. 2 is a perspective view of the catch device, comprising a right-angular plate and a pivoted wedge-shaped piece having a horizontal top flange. Figs. 3 and 4 are detailed views of the latch device carried by the gate.

The letter A designates a gate of any approved construction, and B a post against which said gate abuts when closed, as clearly shown in Fig. 1.

The latch for holding the gate in a closed position comprises a right-angular plate or bar, C, the vertical portion of which is secured to the front face of the gate-post by means of screws or other fastening devices. The bottom or horizontal portion of the plate or bar C is provided with a vertical slit, in which operates a catch-plate, D. The lower portion of the latter is made wedge-shaped, or is provided with an inclined bottom face or edge. The front end of the catch-plate, or the end farthest from the post, is formed with a knuckle, *d*, which fits between similar knuckles, *e*, formed on the outer end of the horizontal portion or arm of the plate C. A pintle or pin passes through the different knuckles, so as to form the hinge-connection of the catch-plate with the angular supporting-plate. The upper end of the catch-plate terminates in a horizontal flange or cap-plate, E, which serves to close the slit or opening in the horizontal arm of the right-angular plate, and prevents the passage of water or snow into the opening in the plate.

It is obvious that, unless the opening in which the catch-plate operates is tightly covered, snow or water, when frozen around said catch-plate, would prevent the movement thereof.

A horizontal rod, F, passing through a mortise made in the end piece of the gate in proper relation to the catch-plate, has its rear end bent at right angles and provided with a screw-thread. A screw-threaded neck, G, is thus formed, which serves for the attachment of an obliquely-extending rod or lever, H, terminating at a suitable distance above the top rail of the gate, so as to permit it to be readily grasped by the hand of the operator. The rod H has an eye at its lower end, which fits on the screw-threaded neck G, and a nut, *g*, applied to the latter serves to hold the rod in place thereon. The rod also has a flattened portion, I, which is generally provided with two holes. A pin passing through either of these two holes and entering the rail of the gate serves as a pivot for permitting the rod H to turn. The upper end of said rod may pass through a keeper or flanged plate, J, which is secured to the top rail of the gate. The weight of the rod is sufficient to keep the horizontal rod or bolt E in a projected position, or, in other words, in engagement with the catch-plate.

The operation of a gate-latch constructed and arranged as above described is as follows, viz: The gate, when closed against the post, will cause the projecting rod F to strike against the wedge-shaped plate, and by doing so said plate is raised, so as to permit the rod or bolt F to pass in rear of the catch-plate, whereupon the latter will drop and rest in front of the rod or bolt, thus maintaining the gate in a closed position.

The horizontal top flange or cap-plate E, in addition to its function as a rain and snow excluding device, also acts to prevent the catch-plate from dropping through the slotted supporting-plate.

In order to release the latch, it is only necessary to swing the upper end of the lever or rod toward the post. This will retract the rod or bolt F from behind the catch-plate, whereupon the gate can be opened by pushing against the same.

I do not broadly claim a gate-latch comprising a wedge-shaped catch-plate on the gate-post and a latch-bolt or bar on the gate adapted to pass under and in rear of said catch-plate; but What I do claim as new, and desire to secure by Letters Patent, is—

The combination of the slotted right-angular plate, the pivoted wedge-shaped or oblique-faced catch having a horizontal top flange, the movable latch bolt or rod, and the pivoted unlatching-lever, with the gate-post, and the gate having an aperture for the passage of the latch-bolt, as and for the purpose set forth.

In testimony whereof I affix my signature in presence of two witnesses.

PHILIP JAMES WINN.

Witnesses:
WM. H. SADLER,
WM. J. WEAVER.